United States Patent
Bobisuthi

(10) Patent No.: US 7,359,525 B1
(45) Date of Patent: *Apr. 15, 2008

(54) MULTI-FUNCTION MICROPHONE BOOM WITH ON-LINE INDICATOR

(75) Inventor: James F. Bobisuthi, Boulder Creek, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/300,717

(22) Filed: Dec. 13, 2005

Related U.S. Application Data

(63) Continuation of application No. 10/879,950, filed on Jun. 25, 2004, now Pat. No. 7,062,059.

(51) Int. Cl.
*H04R 25/00* (2006.01)

(52) U.S. Cl. .................. 381/375; 381/370; 381/382

(58) Field of Classification Search ............... 381/361, 381/362, 370, 374, 375, 382, 172, 338, 376, 381/91, 122; 379/396, 430; 362/105, 800
See application file for complete search history.

(56) References Cited

U.S. PATENT DOCUMENTS

| | | | | |
|---|---|---|---|---|
| 6,690,804 | B2 * | 2/2004 | Everett | 381/91 |
| 6,766,032 | B1 * | 7/2004 | Lee et al. | 381/375 |
| 7,062,059 | B1 * | 6/2006 | Bobisuthi | 381/375 |

* cited by examiner

*Primary Examiner*—Huyen Le

(74) *Attorney, Agent, or Firm*—Intellectual Property Law Office of Thomas Chuang

(57) ABSTRACT

A headset microphone boom that includes a hollow tubular member with a reflective interior surface. A light disperser is coupled to the hollow tubular member at one end and a light emitting device is coupled to the hollow tubular member at the other end. Light is transmitted from the light emitting device through the hollow tubular member to the light disperser. Sound waves are simultaneously transmitted from an acoustic port through the hollow tubular member to a microphone.

10 Claims, 5 Drawing Sheets

MULTI-FUNCTION MICROPHONE BOOM WITH ON-LINE INDICATOR

CROSS REFERENCE TO RELATED APPLICATIONS

This application is a Continuation of application Ser. No. 10/879,950 filed Jun. 25, 2004 now U.S. Pat. No. 7,062,059, entitled "Multi-Function Microphone Boom with On-line Indicator".

TECHNICAL FIELD

The present invention relates to the general field of telecommunications. More specifically the invention relates to headsets.

BACKGROUND

Telephones having headset systems for allowing "hands-free" use are well known, and a great many telephone/headset systems are commercially available. One problem with headset telephones, however, is that passers-by may be unaware that the user of a headset telephone is carrying on a conversation, and may therefore not afford the headset user the same common courtesies as when a telephone user is holding a telephone handset to his or her ear. On the other hand, passers-by who notice that a headset user is wearing a headset may incorrectly assume that the user is carrying on a telephone conversation, possibly causing the passers-by to take unnecessary steps such as speaking in hushed tones or foregoing face-to-face conversations with the headset wearer, in order to avoid interrupting the non-existent telephone conversation.

In order to prevent interruptions of phone conversations when a headset is in use it is desirable to have some sort of visual indication that the headset wearer is actively engaged in a phone conversation. With handsets this is intrinsically obvious but headsets may be worn whether or not the user is actually engaged in a telephone call. Numerous schemes for "on-line" indicators have been proposed in the prior art.

In the prior art, a light source is mounted on the tip of the headset boom and wires are run down the boom to provide control of the light source. Alternatively, the light source may be mounted at the base of the boom and a plastic "light-pipe" is utilized to convey the light down the length of the boom. However, prior art on-line indicators have several disadvantages. Placing the light source at the tip of the boom requires that the boom tip be more bulky than otherwise required which is undesirable from a cosmetic standpoint. Using a plastic light pipe may also increase the size of the boom due to the need for a mouldable thickness and sufficient cross-section.

In the prior art, microphones may be mounted at the base of the boom, and an acoustic waveguide utilized to transmit sound waves associated with user speech from a port at the tip of the boom through the acoustic waveguide in the boom to the microphone. While an acoustic waveguide could be molded into a traditional "light-pipe", strength and manufacturing concerns as well as acoustic performance and/or assembly difficulties limit the minimum external dimensions of the boom in such an approach.

Thus, improved headsets and microphone booms with on-line indicators are needed.

SUMMARY OF THE INVENTION

The present invention provides a solution to the needs described above through an inventive multi-function microphone boom for use with a headset communication device.

The present invention provides for a headset microphone boom that includes a hollow tubular member with a reflective interior surface. The hollow tubular member has a first end and a second end, an acoustic port disposed near the first end, and a second acoustic port disposed near the second end. A lens is coupled to the hollow tubular member at the first end and a light emitting device is coupled to the hollow tubular member at the second end. A microphone is disposed outside the hollow tubular member at the second acoustic port. Light is transmitted from the light emitting device through the hollow tubular member to the lens. Sound waves are simultaneously transmitted from the first acoustic port through the hollow tubular member and second acoustic port to the microphone.

The present invention further provides for a headset microphone boom that includes a hollow tubular member with a first acoustic port and external stop disposed near a first end, a second acoustic port disposed near a second end, and a reflective interior surface. A light dispersing means with engaging arms is coupled to the hollow tubular member at the first end. A windscreen is disposed over the first acoustic port between the external stop and the light refractor, with the windscreen secured to the hollow tubular member by the external stop and light refractor. The light dispersing means performs the dual function of securing the windscreen and illuminating to indicate on-line activity. A light emitting device is coupled to the hollow tubular member at the second end, and a microphone is disposed outside the hollow tubular member at the second acoustic port. Light is transmitted from the light emitting device through the hollow tubular member to the light dispersing means and sound waves are simultaneously transmitted from the first acoustic port through the hollow tubular member and second acoustic port to the microphone.

The present invention further provides for a headset microphone boom that includes a modular hollow tubular member with a reflective interior surface. The modular hollow tubular member has a first end and a second end, with a light dispersing means coupled to the modular tubular member at the first end. The microphone boom further includes a fixed hollow tubular member with a reflective interior surface. The fixed hollow tubular member includes a third end and a fourth end, with a light emitting device coupled to the fixed tubular member at the third end. A microphone is disposed outside the fixed tubular member at a microphone acoustic port. The microphone boom further includes a rotatable turret with a first channel and second channel. The first channel is coupled to the second end of the modular hollow tubular member. The second channel is coupled to the fourth end of the fixed hollow tubular member, with the first channel disposed at an adjustable angle to the second channel. A mirror is disposed at the intersection of the first channel and second channel for reflecting light from the fixed hollow tubular member down the modular hollow tubular member. The fixed hollow tubular member, rotatable turret, and hollow modular tubular member form a continuous channel for the simultaneous propagation of light and sound waves.

The invention provides a method for indicating on-line activity of a headset. A microphone boom with a first end, second end, and transmission channel disposed between the first end and the second end is utilized. A light emitting device is illuminated in proximity to the second end and light is propagated through the transmission channel to the first end. Light received at the first end is dispersed by a lens and visible externally to indicate on-line activity. Sound waves associated with voice communications are received at the second end and propagated through the transmission channel to a microphone disposed in proximity to the first end. Light and sound waves may simultaneously propagate through the transmission channel.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an inventive multi-function microphone boom for use with a headset communication device.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The present invention provides for a headset with boom-mounted on-line indication with a minimum of excess bulk. The invention minimizes the size of the boom by using a single channel which serves both as a voice-tube and light-pipe. The present invention provides for improved product appearance and a reduction in parts required to achieve the on-line indicator function by utilizing components which perform multiple functions. An additional feature of the invention includes a tip mounted lens which refracts indicator light and also serves the function of securing a windscreen to the microphone boom.

Figure 1:
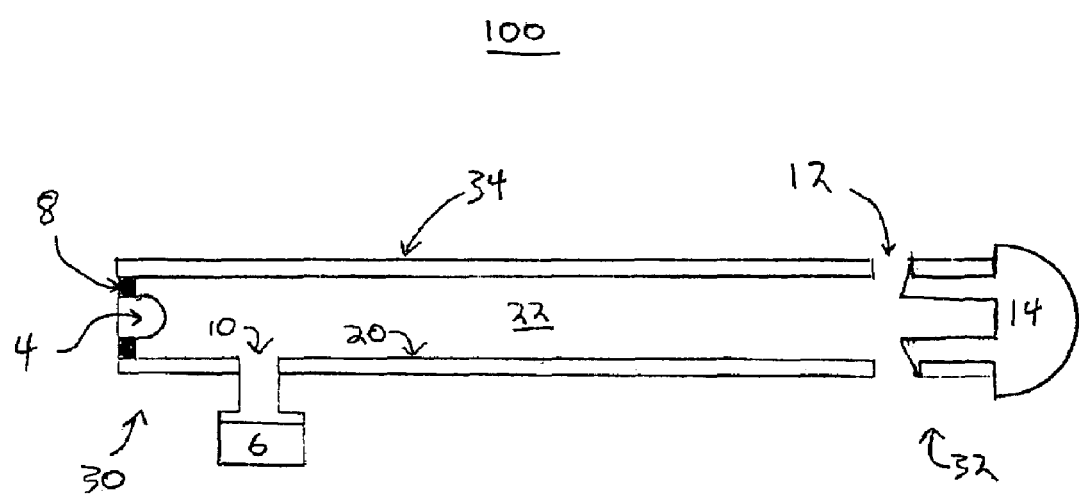
FIG. 1 is a schematic view of an embodiment of the microphone boom of the present invention.
Figure 2:
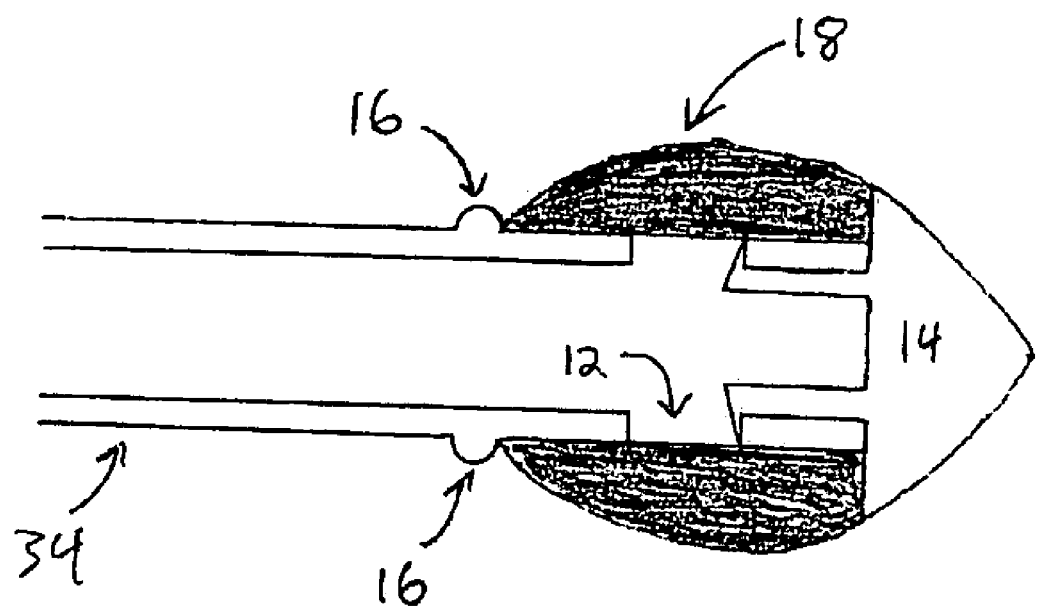
FIG. 2 is a close-up sectional schematic view of one end of an embodiment of the microphone boom of the present invention.

FIGS. 1 and 2 illustrate a schematic view of an embodiment of the microphone boom of the present invention for use with a headset communication device. Microphone boom 100 includes a near end 30 which is disposed near a users head during operation. Microphone boom 100 further includes a far end 32 which is extended away from the user's head during operation in order to be better positioned to detect user voice communications.

Microphone boom 100 includes a hollow tubular member 34 generally one to four inches in length. While hollow tubular member 34 is disclosed as a hollow tubular member with a circular cross section, hollow tubular member 34 may be constructed with different shaped cross-sections without departing from the spirit of the invention. The hollow interior of hollow tubular member 34 functions as a transmission channel 22 for both light and sound waves The length of hollow tubular member 34 may be varied to accommodate different users.

The far end 32 of microphone boom 100 includes a swaged ridge 16 on hollow tubular member 34 inset a small distance from the termination of hollow tubular member 34. Hollow tubular member 34 further includes one or more voice entry ports 12 at the far end 32 which function to allow sound waves associated with user voice communications to enter hollow tubular member 34. Although illustrated as a rectangular slot, voice entry port 12 may be other shapes. In order to provide improved clarity and reception of the sound waves, multiple voice entry ports 12 may be utilized circumscribing hollow tubular member 34. In a further preferred embodiment, a collar may be attached to hollow tubular member 34 rather than the use of swaged ridge 16. The collar may include protruding members that "snap" into voice ports 12 to secure the collar to hollow tubular member 34.

The wavelength of sound entering voice entry port 12 is large relative to the length of hollow tubular member 34. As a result, voice entry port 12 need not be at the end of hollow tubular member 34 and a lens 14 may be placed at the end of the tube with voice entry ports 12 disposed on one or more sides of hollow tubular member 34.

In an embodiment of the invention, hollow tubular member 34 is made from a metal material with a reflective interior surface 20. The interior of hollow tubular member 34 is filled only with air which has adequate transparency for the transmission of light waves. The reflective property of the interior surface of hollow tubular member 34 is advantageous for propagation of light down tubular member 34. As such, metal is particularly advantageous as the preferred material since it is inherently reflective, strong, and can be used to transmit sound and light simultaneously. However, other materials can be used without departing from the scope of the invention. For example, hollow tubular member 34 may be constructed of a pliable material which allows the user to bend hollow tubular member 34 for maximum comfort and operation. In such an embodiment, the interior surface of hollow tubular member 34 is coated with a reflective material, polished, or mirrored. With a reflective inner surface, relatively little losses of light will occur for gradual bends in hollow tubular member 34.

At the far end 32 of microphone boom 100, a lens 14 is attached to the end of hollow tubular member 34. In one embodiment of the invention, a feature of the invention provides for the use of lens 14 to increase the external viewing angle of the light transmitted from light emitting device 56 through hollow tubular member 34 and to provide for improved brightness. Lens 14 disperses the light beam to allow the light to be externally visible from as wide an angle as possible while simultaneously improving the brightness of the visible light emitted from microphone boom 100. Lens 14 may further include a translucent or frosted component. In an additional embodiment of the invention, microphone boom 100 may include a light dispersing translucent or frosted material attached to the hollow tubular member 34 in place of a lens.

Figure 3:
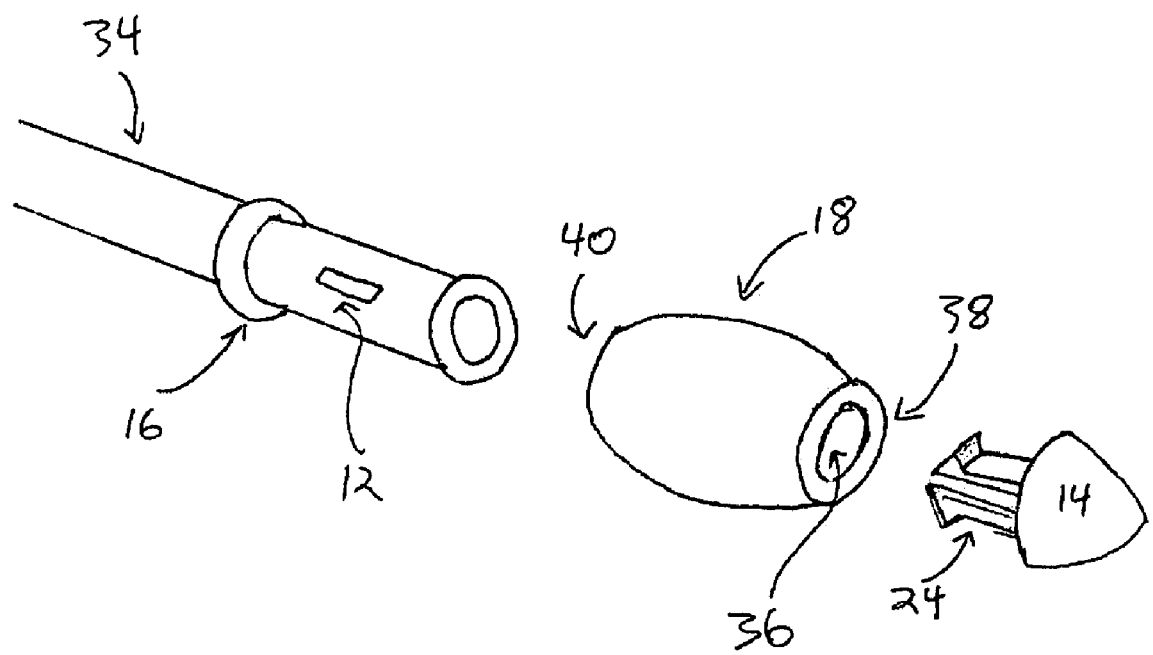
FIG. 3 is a disassembled perspective view of one section of an embodiment of the microphone boom of the present invention.

Microphone boom 100 may also include a windscreen 18. Referring to FIG. 3, a disassembled perspective view of far end 32 of microphone boom 100 is illustrated. As illustrated, the far end 32 of microphone boom 100 includes a windscreen 18 that is positioned over voice entry port 12 to reduce the effects of wind noise from reaching microphone 6. Windscreen 18 is selected from a porous plastic material ensuring that the material does not substantially interfere with sounds directed into the voice entry port 12. Windscreen 18 is a single piece construction with an opening 38 and an opening 40 leading to a cavity 36. Opening 40 is sized to overfit the end of hollow tubular member 34.

Windscreen 18 is stopped from sliding down hollow tubular member 34 towards near end 30 by swaged ridge 16 formed on the outer surface of hollow tubular member 34. Alternatively, a collar which snaps into voice entry ports 12 may be utilized in place of swaged ridge 16 to stop secure windscreen 18. Windscreen 18 may be composed of a flexible foam material when used in conjunction with the collar. Swaged ridge 16 is positioned at a distance from the end of hollow tubular member 34 such that opening 38 is aligned with the end of hollow tubular member 34. Engaging arms 24 of lens 14 are sized to fit through opening 38 and into the end of hollow tubular member 34 and form a secure fit with the interior surface of hollow tubular member 34. As a result, a secure mechanical fit of windscreen 18 is achieved by swaged ridge 16 and lens 14 without the need for glue or other attachment means. A feature of the invention utilizes lens 14 to perform the dual function of providing retention of windscreen 18 without the need for adhesive as well as illumination to indicate on-line activity.

Engaging arms 24 can be formed in varying shapes to provide adequate securing of lens 14 to hollow tubular member 34. Engaging arms 24 may also be constructed to "snap" into voice entry ports 12 from the exterior of hollow tubular member 34 to secure lens 14 rather than being inserted into hollow tubular member 34. Furthermore, swaged ridge 16 can be formed in various shapes to align and prevent windscreen 18 from sliding down hollow tubular member 34 without departing from the spirit of the invention.

Referring to FIGS. 1 and 2, microphone boom 100 includes a near end 30. At near end 30, hollow tubular member 34 includes a port 10 leading to a cavity in which a microphone 6 is disposed. At the entrance of hollow tubular member 34 a light emitting device 4 is disposed. A seal 8 ensures that loss of acoustic energy within hollow tubular member 34 is minimized due to the light emitting device 4 and hollow tubular member 34 interface. Seal 8 also ensures that microphone 6 will only detect sound waves propagating from far end 32 of microphone boom 100. Microphone 6 is positioned outside the line of sight between light emitting device 4 and lens 14 so that light may propagate without interference down hollow tubular member 34.

In an embodiment of the invention, light emitting device 4 is a light emitting diode (LED). Light emitting device 4 is controlled via an LED control circuit which provides current pulses to light emitting device 4 at a predetermined rate. When the LED control circuit receives power, light emitting device 4 will flash on and off to indicate an on-line (also referred to herein as in-use) condition of the telephone headset. Alternatively, light emitting device 4 may remain illuminated using a constant current supply to indicate on-line activity. It is contemplated that another type of visual indicator could be substituted in place of light emitting device 4, as would be appreciated by those of ordinary skill in the art. LED control circuits are discussed in further detail in U.S. Pat. No. 5,359,647 entitled "Headset In-Use Indicator", which is assigned to Plantronics, Inc., and is hereby incorporated by reference.

Figure 5:
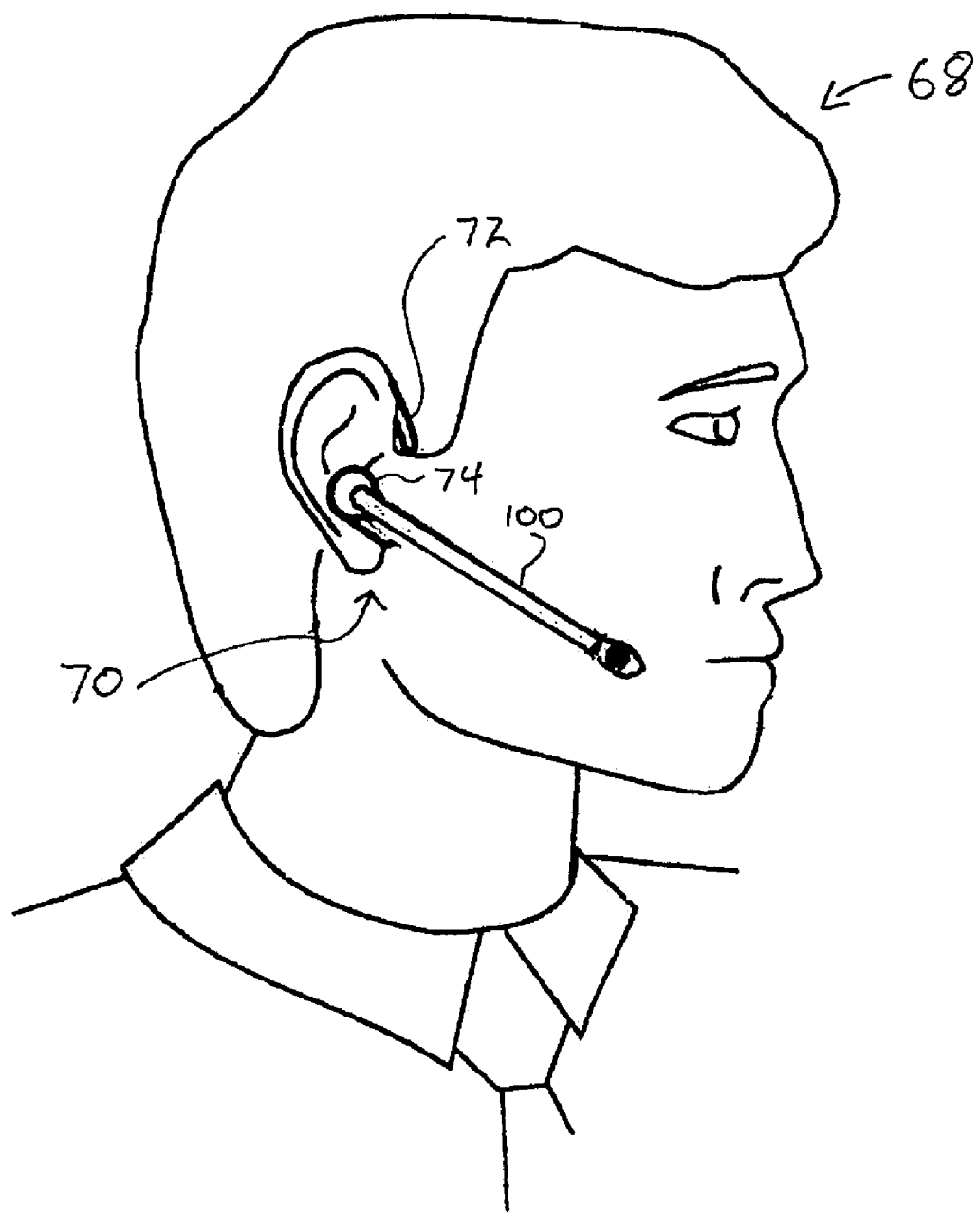
FIG. 5 is an illustration of a user wearing an embodiment of a headset with an embodiment of the microphone boom of the present invention.

The operation of the headset microphone boom will now be described in reference to FIGS. 1 and 5. Referring to FIG. 5, an illustration of a user 68 of a headset 70 with microphone boom 100 is shown. Headset 70 includes an ear-hook 72 sized and shaped to be comfortably placed around a human ear along with a speaker 74 that is placed in the ear of user 68. Although headset 70 is illustrated with an ear-hook wearing means, other means for positioning the microphone boom 100 and speaker 74 may be utilized, such as a headband for example.

During on-line operation of the microphone boom in which a user is communicating with a different telephonic device, light emitting device 4 receives power and either flashes intermittently or remains illuminated to indicate on-line activity. Light from light emitting device 4 propagates down hollow tubular member 34 from near end 30 to far end 32 of microphone boom 100, reflecting off reflective inner surface 20. When light reaches lens 14, the light is refracted and visible to external observers of microphone boom 100. Simultaneous to the transmission of light down hollow tubular member 34, sound waves associated with speech from the user enters voice entry port 12 and propagates down hollow tubular member 34 from far end 32 to near end 30 of microphone boom 100. The sound waves are received by microphone 6 via port 10.

Figure 4:
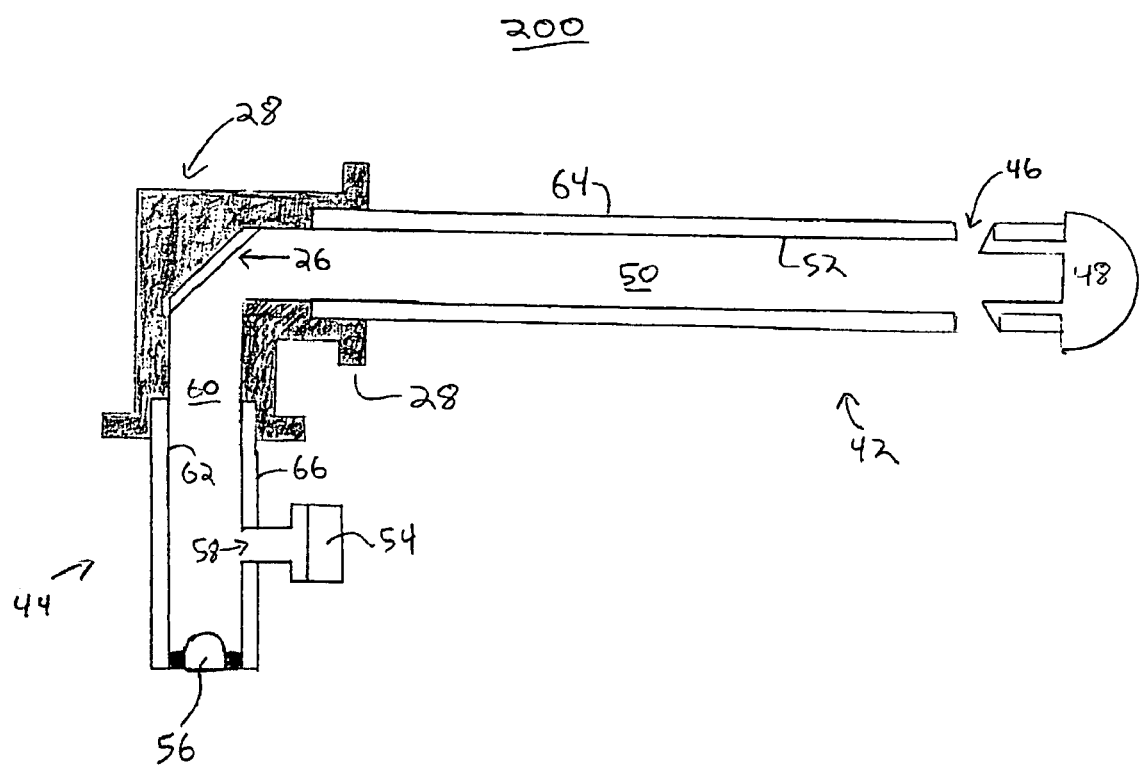
FIG. 4 is a schematic view of a further embodiment of the microphone boom of the present invention.

FIG. 4 illustrates a schematic view of a further embodiment of a microphone boom of the present invention. The further embodiment illustrated in FIG. 4 allows for replacement of a microphone boom section, if necessary, without having to simultaneously replace electrical components such as light emitting device 4 and microphone 6. Microphone boom 200 includes a replicable modular section 42, fixed section 44, and rotating turret 28. Modular section 42 and fixed section 44 are attached via a rotating turret 28 such that modular section 42 can be rotated to place modular section 42 in the most advantageous position near the user's mouth.

Although modular section 42 and fixed section 44 are illustrated as being at right angles with respect to each other, the angle between modular section 42 and fixed section 44 may be adjusted by rotating turret 28 to allow for advantageous positioning of modular section 42. Rotating turret 28 includes a mirror 26 at the intersection of modular section 42 and fixed section 44 to reflect light propagating through fixed section 44 down modular section 42. In an embodiment of the invention, rotating turret 28 is a 360 degree rotatable turret and includes a linking channel with a first end that modular section 42 mates with and a second end that fixed section 44 mates. The linking channel includes a bend at mirror 26.

Modular section 42 utilizes a hollow tubular member 64 and includes port 46 and lens 48 disposed at a far end to be directed in proximity towards a user mouth to advantageously detect sound waves associated with user speech. The hollow interior of hollow tubular member 64 functions as a transmission channel 50 for both light and sound waves. The interior surface of hollow tubular member 64 has a reflective inner surface 52. Modular section 42 does not include any electronic components.

Fixed section 44 utilizes a hollow tubular member 66, which has a reflective inner surface 62. Fixed section 44 also includes microphone 54 and light emitting device 56. At an end closest to the user ear, hollow tubular member 66 includes a port 58 leading to a fixed boot with microphone 54. The hollow interior of hollow tubular member 66 functions as a transmission channel 60 for both light and sound waves. At the entrance of hollow tubular member 66 light emitting device 56 is disposed. Microphone 54 is positioned outside the line of sight between light emitting device 56 and mirror 26 so that light may propagate without interference down fixed section 44. Transmission channel 50, the linking channel, and transmission channel 60 form a continuous channel in which light and sound waves can propagate in either direction.

The operation of microphone boom 200 will now be described. During on-line operation of microphone boom 200 in which a user is receiving and transmitting voice communications, light emitting device 56 flashes intermittently or remains illuminated to indicate on-line activity. Light from light emitting device 56 propagates down hollow tubular member 66 is reflected by mirror 26 down hollow tubular member 64. When the reflected light reaches lens 48 it is refracted and visible to external observers of microphone boom 200. Simultaneously, during on-line activity, sound waves associated with speech from the user enter port 46 and propagate down hollow tubular member 64 and hollow tubular member 66. The sound waves exit hollow tubular member 66 through port 58 and are detected by microphone 54. Microphone boom 200 eliminates the need for flexible wires on either the microphone or light source since no electrical connection is required in the pivoting assembly. One of ordinary skill in the art will recognize that other architectures for coupling modular section 42 and fixed section 44 in an adjustable and modular configuration may be employed.

Thus, the invention provides an improved design for headsets and microphone booms with on-line indicators. Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A headset microphone boom comprising:
    a hollow member comprising a first end, a second end, and an acoustic port disposed near the first end;
    a translucent material coupled to the hollow member at the first end; and
    a light emitting device coupled to the hollow member at the second end, wherein the hollow member transmits light from the light emitting device to the translucent material and transmits sound waves from the acoustic port toward the second end.

2. The headset microphone boom of claim 1, wherein the hollow member comprises metal.

3. The headset microphone boom of claim 1, wherein the hollow member comprises a pliable material.

4. The headset microphone boom of claim 1, wherein the hollow member comprises a circular cross-section.

5. The headset microphone boom of claim 1, wherein the light emitting device is a light emitting diode.

6. The headset microphone boom of claim 1, further comprising a windscreen secured over the acoustic port.

7. The headset microphone boom of claim 6, wherein the windscreen is secured over the acoustic port by the translucent material.

8. The headset microphone boom of claim 6, wherein the windscreen comprises porous plastic.

9. The headset microphone boom of claim 1, further comprising a lens disposed at the first end.

10. The headset microphone boom of claim 1, further comprising a microphone disposed at the second end for receiving the sound waves from the acoustic port.

\* \* \* \* \*